United States Patent
Zawacki et al.

(10) Patent No.: US 10,611,206 B2
(45) Date of Patent: *Apr. 7, 2020

(54) AIR SUSPENSION CONTROL SYSTEM

(71) Applicant: Hendrickson USA, L.L.C., Itasca, IL (US)

(72) Inventors: Jeffrey R. Zawacki, Channahon, IL (US); Michael J. Keeler, Naperville, IL (US); Ashley Thomas Dudding, Yorkville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,675

(22) Filed: Mar. 12, 2014

(65) Prior Publication Data
US 2015/0329099 A1 Nov. 19, 2015

Related U.S. Application Data

(60) Provisional application No. 61/779,140, filed on Mar. 13, 2013.

(51) Int. Cl.
*B60G 17/052* (2006.01)
*B60W 10/22* (2006.01)
(Continued)

(52) U.S. Cl.
CPC ............. *B60G 17/052* (2013.01); *B60G 5/00* (2013.01); *B60W 10/18* (2013.01); *B60W 10/22* (2013.01);
(Continued)

(58) Field of Classification Search
CPC . B60G 2204/121; B60G 11/12; B60G 11/113; B60G 7/02; B60G 17/04;
(Continued)

(56) References Cited

U.S. PATENT DOCUMENTS 2,864,454 A 12/1958 LaBelle
3,055,678 A 9/1962 Alfieri
(Continued)

FOREIGN PATENT DOCUMENTS

CA 1337492 C 10/1995
DE 2740264 A 3/1979
(Continued)

OTHER PUBLICATIONS

Office Action Issued by the Mexico Intellectual Property Office for Application No. Mx/a/2014/002930, dated Jun. 11, 2019 with English Translation (10 pages).

*Primary Examiner* — Hunter B Lonsberry
*Assistant Examiner* — Luis A Martinez Borrero
(74) *Attorney, Agent, or Firm* — Cook Alex Ltd.

(57) ABSTRACT

An automatic air suspension control system is provided for use in combination with a vehicle having a non-driven rear axle, a driven rear axle, and an air suspension associated with the rear axles to apply a load to each of the rear axles. The air suspension control system is programmed to maintain the load applied to the non-driven rear axle at a level that is less than the load applied to the driven rear axle until the load applied to the driven rear axle is equal to a threshold amount. The threshold amount may be equal to the maximum load that may be legally applied to the driven rear axle or some lower level. There may be no load applied to the non-driven rear axle prior to the load on the driven rear axle reaching the threshold amount or may be a non-zero amount.

30 Claims, 8 Drawing Sheets

(51) Int. Cl.
*B60W 10/18* (2012.01)
*B60W 30/02* (2012.01)
*B60G 5/00* (2006.01)

(52) U.S. Cl.
CPC ........ *B60W 30/02* (2013.01); *B60G 2202/152* (2013.01); *B60G 2400/61* (2013.01); *B60G 2500/20* (2013.01); *B60G 2600/02* (2013.01); *B60G 2800/214* (2013.01); *B60W 2400/00* (2013.01); *B60W 2520/26* (2013.01); *B60W 2710/182* (2013.01); *B60W 2710/22* (2013.01)

(58) Field of Classification Search
CPC ...... B60G 15/12; B60G 11/26; B60G 17/016; B60G 2204/126; B60G 2204/4504; B60G 2202/152; B60G 2800/0124; B60G 2800/019; B60G 2800/915; B60G 17/0155; B60G 17/052; B60G 5/00; B60W 2050/0096; B60W 10/22; B60W 10/10; B60W 10/18; B60W 10/20; B60W 10/045; B60W 10/08; B60W 30/182; B60W 10/30; B60W 2510/244; B60W 50/045; B60W 10/06; B62D 61/125; B62D 11/183; B62D 33/0633; B62D 53/026
USPC ........... 701/36, 37, 103, 112, 91, 1, 102, 38; 280/124.163, 124.116, 124.17, 124.146, 280/124.106
See application file for complete search history.

(56) References Cited

U.S. PATENT DOCUMENTS

| | | | |
|---|---|---|---|
| 3,366,399 A | 1/1968 | Hunger | |
| 3,659,671 A * | 5/1972 | Heinze | B62D 61/125 180/24.02 |
| 4,202,564 A * | 5/1980 | Strader | B60G 5/04 280/124.158 |
| 4,637,627 A * | 1/1987 | Stone | B60G 5/047 180/24.02 |
| 4,854,409 A * | 8/1989 | Hillebrand | B62D 61/125 180/24.02 |
| 4,944,526 A | 7/1990 | Eberling | |
| 4,993,729 A * | 2/1991 | Payne | B60G 17/0523 180/24.02 |
| 5,025,877 A | 6/1991 | Assh | |
| 5,048,867 A * | 9/1991 | Gradert | B60G 17/0155 280/6.158 |
| 5,180,185 A | 1/1993 | Eckert | |
| 6,276,710 B1 * | 8/2001 | Sutton | B60G 5/04 280/124.128 |
| 6,431,557 B1 * | 8/2002 | Terborn | B60G 9/02 280/5.507 |
| 6,550,798 B2 * | 4/2003 | MacKarvich | B60G 3/145 180/906 |
| 6,808,035 B1 * | 10/2004 | Keeler | B60G 7/02 180/197 |
| 6,921,100 B2 * | 7/2005 | Mantini | B60G 17/005 177/137 |
| 6,923,453 B2 * | 8/2005 | Pivac | B60G 17/005 280/280 |
| 6,966,612 B2 * | 11/2005 | Philpott | B60B 35/02 280/124.11 |
| 7,222,867 B2 * | 5/2007 | Rotz | B60G 17/0155 180/209 |
| 7,380,799 B2 * | 6/2008 | Niaura | B60G 15/14 267/64.21 |
| 7,661,681 B1 * | 2/2010 | Zork | B60G 9/003 280/5.514 |
| 7,841,607 B2 * | 11/2010 | Dodd | B60G 11/46 280/124.128 |
| 7,841,608 B2 * | 11/2010 | Morris | B60G 17/0155 280/124.157 |
| 7,871,081 B1 * | 1/2011 | Lin | B60G 11/27 280/124.159 |
| 8,360,451 B2 * | 1/2013 | Hammond | B60G 17/052 280/124.157 |
| 8,695,998 B1 * | 4/2014 | Karel | B62D 61/12 280/86.5 |
| 8,720,938 B2 * | 5/2014 | Ehrlich | B60G 17/0528 280/683 |
| 8,935,054 B2 * | 1/2015 | Mantini | B60G 17/019 280/81.6 |
| 8,955,858 B2 * | 2/2015 | Koontz | B60G 17/0526 280/124.11 |
| 9,056,537 B2 * | 6/2015 | Eberling | B60G 17/005 |
| 9,346,332 B2 * | 5/2016 | Remboski | B60G 5/00 |
| 10,358,011 B2 * | 7/2019 | Blessing | B60G 5/00 |
| 2001/0052685 A1 * | 12/2001 | Svartz | B60G 7/02 280/124.116 |
| 2002/0066605 A1 * | 6/2002 | McClelland | B60G 17/0195 180/24.02 |
| 2002/0074746 A1 * | 6/2002 | Eberling | B60G 17/0155 280/5.5 |
| 2003/0155164 A1 * | 8/2003 | Mantini | B60G 17/005 280/149.2 |
| 2006/0170168 A1 * | 8/2006 | Rotz | B60G 17/0155 280/5.501 |
| 2007/0200304 A1 * | 8/2007 | Brookes | B60G 17/0155 280/5.514 |
| 2007/0290461 A1 * | 12/2007 | Oscarsson | B60G 11/28 280/6.15 |
| 2008/0023927 A1 * | 1/2008 | Kim | B60G 17/0155 280/5.514 |
| 2009/0179398 A1 * | 7/2009 | Mullican | B60G 9/00 280/124.162 |
| 2009/0206570 A1 * | 8/2009 | Strong | B62D 61/12 280/86.5 |
| 2010/0133771 A1 * | 6/2010 | Hudson | B60G 17/017 280/86.5 |
| 2010/0230913 A1 * | 9/2010 | Peterson | B60G 17/0155 280/5.503 |
| 2012/0123646 A1 * | 5/2012 | Mantini | B60G 17/019 701/48 |
| 2013/0119637 A1 * | 5/2013 | Risse | B60G 17/0155 280/405.1 |
| 2013/0140784 A1 * | 6/2013 | Ehrlich | B60G 17/0528 280/124.159 |
| 2014/0095023 A1 * | 4/2014 | Myggen | B60G 17/016 701/37 |
| 2014/0167378 A1 * | 6/2014 | Koontz | B60G 17/0526 280/124.11 |
| 2015/0258871 A1 * | 9/2015 | Remboski | B60G 5/00 280/124.16 |
| 2015/0329099 A1 * | 11/2015 | Zawacki | B60G 17/052 701/37 |
| 2016/0257355 A1 * | 9/2016 | Siuchta | B62D 53/068 |
| 2016/0332498 A1 * | 11/2016 | Lindsay | B60T 13/662 |
| 2017/0361675 A1 * | 12/2017 | Blessing | B60G 5/00 |
| 2018/0186208 A1 * | 7/2018 | Coombs | B60G 17/0165 |
| 2019/0077468 A1 * | 3/2019 | Hulstein | B62D 33/077 |

FOREIGN PATENT DOCUMENTS

| | | |
|---|---|---|
| DE | 3120178 A | 12/1982 |
| DE | 3628681 A | 3/1988 |
| DE | 3815612 A | 11/1989 |
| DE | 3824366 A | 1/1990 |
| DE | 4222922 A1 | 7/1993 |
| DE | 4314994 C1 | 9/1994 |
| DE | 19905113 A1 | 8/2000 |
| DE | 102006011183 A1 | 9/2007 |
| DE | 102010053264 A1 | 6/2012 |
| EP | 0170794 B1 | 2/1986 |
| EP | 0284572 A | 9/1988 |
| EP | 0301225 A | 2/1989 |
| EP | 0311527 B1 | 4/1989 |

(56) References Cited

FOREIGN PATENT DOCUMENTS

| EP | 0352426 B1 | 12/1992 |
| EP | 0416310 B1 | 9/1993 |
| EP | 1571014 B1 | 9/2005 |
| EP | 1571015 A2 | 9/2005 |
| FR | 2238605 A | 3/1975 |
| FR | 2281849 A | 4/1976 |
| FR | 2590525 A | 5/1987 |
| GB | 1358920 A | 7/1974 |
| GB | 2081655 A | 2/1982 |
| GB | 2288771 A | 11/1995 |
| WO | WO2005108147 A1 | 11/2005 |
| WO | WO 2006043872 A1 | 4/2006 |
| WO | WO2007050014 A1 | 5/2007 |
| WO | WO 2012002878 A1 | 1/2012 |

\* cited by examiner

AIR SUSPENSION CONTROL SYSTEM

CROSS-REFERENCE TO RELATED APPLICATIONS

This patent application claims priority to and the benefit of U.S. Patent Application Ser. No. 61/779,140, filed Mar. 13, 2013, all of which is incorporated herein by reference in its entirety.

BACKGROUND OF INVENTION

Field of the Disclosure

The present disclosure generally relates to vehicle air suspensions. More particularly, the present disclosure relates to control systems for the air suspensions of 6×2 vehicles.

Description of Related Art

In North America, the majority of semi tractor-trailer combinations with tandem rear axles run in what is known as a 6×4 configuration. This nomenclature designates that six independent wheel positions exist on the tractor (i.e., two for the front axle and two for each of the two rear axles) and that four of those wheel positions are driven to provide propulsion of the vehicle. Typically, this is intended to mean that the four rear wheel positions are driven, with the two front axle wheel positions being non-driven and having the primary purpose of steering the vehicle. Additional configurations exist such as 6×2 (only one of the two rear axles is driven) and 4×2 (a truck with two axles having only one driven axle) configurations, to a lesser degree. The 4×2 configuration is limited by federal bridge laws to only allow a certain total vehicle load, whereas the 6×2 configuration has equal load carrying capability to a 6×4 configuration.

The key advantage of a 6×4 configuration is traction, while the key drawback is reduced fuel economy due to increased parasitic losses from the additional gearset needed to drive the second axle. When fuel prices are low, fleets tend to specify the 6×4 configuration to improve productivity, as fewer trucks will get stuck due to traction problems, especially in inclement weather such as snow and ice. As fuel prices have increased significantly in recent years, fleets are turning to 6×2 configurations as a possible method of improving their overall operating cost of fuel.

6×2 configurations have been widely used in Europe and other parts of the world for many years. To overcome the inherent traction issues, European tractors are equipped with Electronically Controlled Air Suspensions (ECAS), which incorporate a control unit, pressure sensors, wheel speed sensors, and valves with certain control logic to shift load toward the driven axle and away from the non-driven axle when wheel-slip is detected. By increasing load on the driven axle, more tractive effort is attained and the vehicle can move at slow speeds until is able to regain enough traction, at which point the system reverts to its normal operation maintaining a 50/50 load bias between both axles of the tandem. ECAS systems are a standard offering in Europe, however, they have not been used widely in North America due to their added cost and complexity. In North America, when 6×2 configurations have been utilized, a manual "air dump" valve has typically been run to the cab, giving the driver the option to release air from the non-driven axle's suspension when needed, thus transferring load to the driven axle. While simple and low cost, this method allows for operator error, which could inadvertently leave excessive load on the driven axle violating federal bridge laws. In order to be used effectively, this would require additional training and experience for the driver.

Systems have begun to be marketed in North America for a control module for 6×2 configurations that would automate this process, similar to an ECAS system. In all of these cases, the system monitors wheel speed and direction and, upon wheel slip, adjusts air pressure to put more load on the driven axle. Again, once traction is regained and the vehicle returns to normal speeds, the load bias is returned to 50/50 between both axles of the tandem.

Those skilled in the art of tire design, use and wear, will recognize an inherent design short-coming of a 6×2 tractor with 50/50 load bias on the tandem. A key difference between a 6×4 configuration and a 6×2 configuration is that a 6×4 configuration splits the torque transferred from the engine between two driven axles. In the case of a 6×2 configuration, 100% of the drive torque must go through the single driven axle. This increased torque at the same axle load will proportionally increase the longitudinal slip experienced by the tire. Longitudinal slip is a phenomenon that all rubber pneumatic tires experience when rotating to drive a vehicle. It is a slip that occurs in the direction of travel. This slip causes wear of the tire over time and, with the increased torque applied in a 6×2 configuration, will significantly reduce the tire life that fleets experience.

If all vehicles were to drive around fully loaded, increased longitudinal slip would likely not be a significant issue, as the increased wear of the driven axle tires might be offset by the improved wear of the non-driven axle. Rarely, however, is this the case. According to the most recent study by the US Department of Transportation, 53% of loads carried by tractor trailer combination class 8 vehicles are below 60,000 pounds. Assuming the front steer axle maintains a load of approximately 12,000 pounds, and equal distribution of the remaining load between the other axles, that would put approximately 24,000 pounds each on the tractor and trailer tandems. With 50/50 load bias, the driven axle would be loaded to only around 12,000 pounds of its legal 20,000 pound limit while still taking 100% of the drive torque.

In view of the foregoing shortcomings of known air suspension control systems, it would be advantageous to provide an air suspension control system that improves traction and reduces tire wear when the associated vehicle is under-loaded.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an automatic air suspension control system is provided for use in combination with a vehicle having a non-driven rear axle, a driven rear axle, and an air suspension associated with the rear axles to apply a load to each of the rear axles. The air suspension control system is programmed to maintain the load applied to the non-driven rear axle at a level that is less than the load applied to the driven rear axle until the load applied to the driven rear axle is equal to a threshold amount.

In another aspect, a vehicle traction control system is provided. The vehicle traction control system includes a non-driven rear axle and a driven rear axle. An air suspension is associated with the rear axles, with an automatic air suspension control system is associated with the air suspension. The automatic air suspension control system is programmed to maintain the load applied to the non-driven rear axle at a level that is less than the load applied to the driven rear axle until the load applied to the driven rear axle is equal to a threshold amount.

In yet another aspect, a method is provided for controlling the traction of a vehicle having a non-driven rear axle, a driven rear axle, and an air suspension associated with the rear axles to apply a load to each of the rear axles. The method includes maintaining the load applied to the non-driven rear axle at a level that is less than the load applied to the driven rear axle until the load applied to the driven rear axle is equal to a threshold amount.

In another aspect, an automatic air suspension control system is provided for use in combination with a vehicle having a non-driven rear axle, a driven rear axle, and an air suspension associated with the rear axles to apply a load to each of the rear axles. The air suspension control system is programmed to apply the maximum available load to the driven rear axle until the load applied to the driven rear axle is equal to a threshold amount.

In yet another aspect, a vehicle traction control system is provided. The vehicle traction control system includes a non-driven rear axle and a driven rear axle. An air suspension is associated with the rear axles, with an automatic air suspension control system is associated with the air suspension. The automatic air suspension control system is programmed to apply the maximum available load to the driven rear axle until the load applied to the driven rear axle is equal to a threshold amount.

In another aspect, a method is provided for controlling the traction of a vehicle having a non-driven rear axle, a driven rear axle, and an air suspension associated with the rear axles to apply a load to each of the rear axles. The method includes applying the maximum available load to the driven rear axle until the load applied to the driven rear axle until the load applied to the driven rear axle is equal to a threshold amount.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Figure 1:
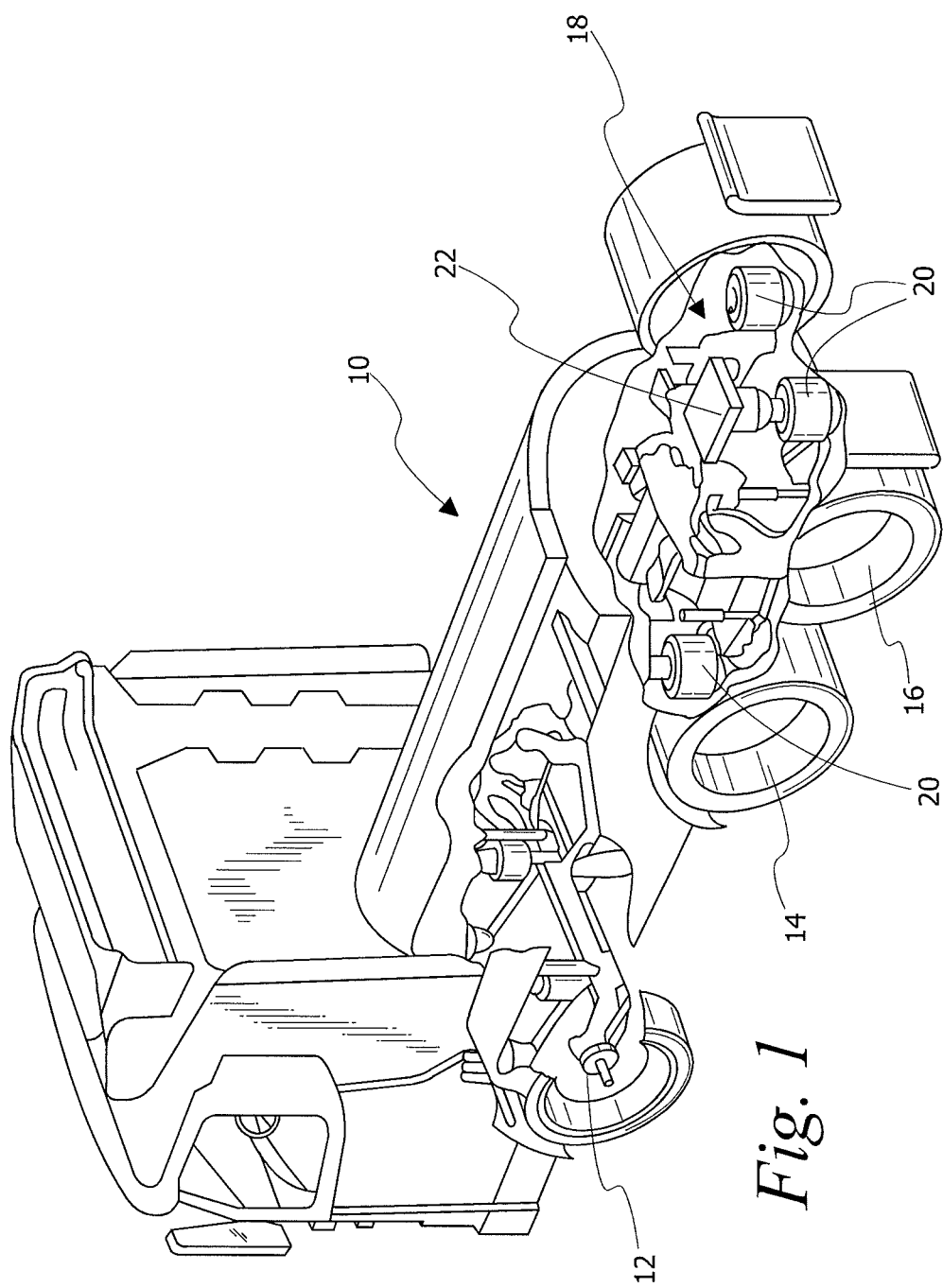
FIG. 1 is a perspective view of a vehicle having an air suspension, with selected portions of the vehicle broken away to better show the air suspension.

FIG. 1 illustrates a vehicle 10 having a front axle 12 and two rear axles 14 and 16. In a preferred embodiment, the vehicle 10 has a 6×2 configuration, with the front axle 12 and one of the rear axles being non-driven and the other rear axle being driven. Preferably, the foremost rear axle 14 is a non-driven pusher axle that may be selectively moved into and out of contact with a ground surface, with the rearmost rear axle 16 being the driven axle. However, it is also within the scope of the present disclosure for the foremost rear axle 14 to be driven and for the rearmost rear axle 16 to be a non-driven tag axle.

The vehicle 10 further includes an air suspension 18 associated with at least the rear axles 14 and 16. The air suspension 18 may comprise a single system that controls both axles 14 and 16 or separate systems for each axle 14, 16 that communicate to jointly control the axles 14 and 16. The air suspension 18 includes one or more ride springs 20 associated with each of the rear axles 14 and 16. The load applied on each rear axle 14, 16 may be varied by adjusting the air pressure in the ride springs 20, and is controlled by an automatic air suspension control system 22, which coordinates with sensors and valves of the air suspension 18 to add air to or vent air from the ride springs 20. The automatic air suspension control system 22 is itself a part of a vehicle traction control system, along with a brake control system, which will be described in greater detail herein.

If the non-driven rear axle is liftable, the air suspension 18 may further include one or more lift springs 24 (FIG. 2) associated with that axle and configured to lift and maintain the axle out of contact with a ground surface when there is no load applied to the axle. When a load is to be applied to the axle by the associated ride spring 20, the lift spring 24 is actuated by the air suspension control system 22 (typically by venting air from the lift spring 24 or otherwise decreasing the air pressure in the lift spring 24) to lower into contact with the ground surface.

According to an aspect of the present disclosure, the automatic air suspension control system 22 is programmed to maintain the loads on the rear axles 14 and 16 at different levels when the vehicle 10 is loaded below a certain level. In particular, at relatively low load levels, the automatic air suspension control system 22 is programmed to maintain a higher load on the driven rear axle than on the non-driven rear axle. Stated differently, the automatic air suspension control system 22 is programmed to bias the loads on the rear axle of a tandem set in order to maintain a relatively high load on the driven rear axle (up to the maximum legal load) at all times. Such a traction control system provides for the best traction at all times and decreases the longitudinal slip (i.e., tire wear) associated with running a 6×2 configuration.

Figure 2:
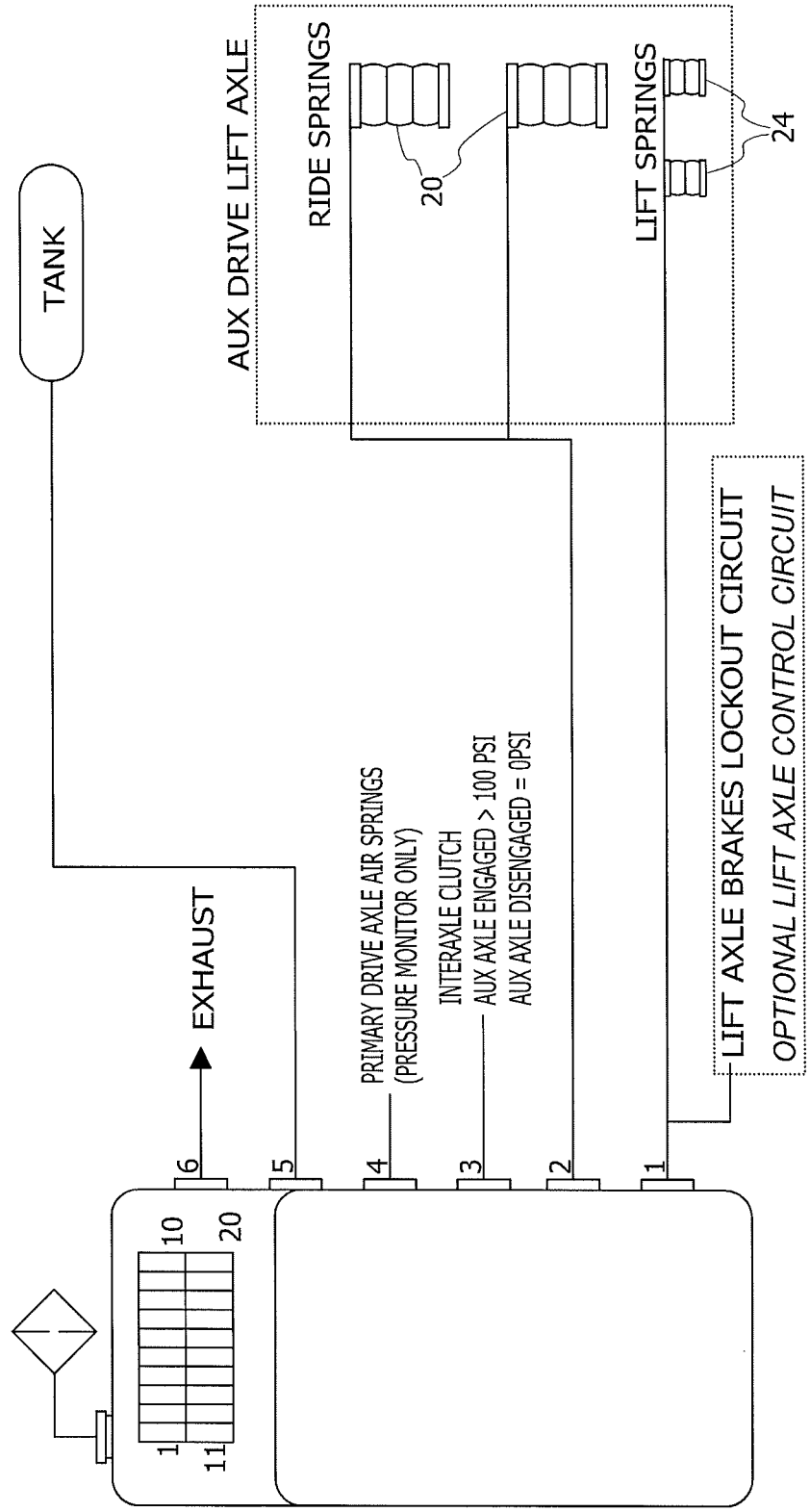
FIG. 2 is a schematic view of a portion of a pneumatic system of a traction control system according to the present disclosure.
Figure 3:
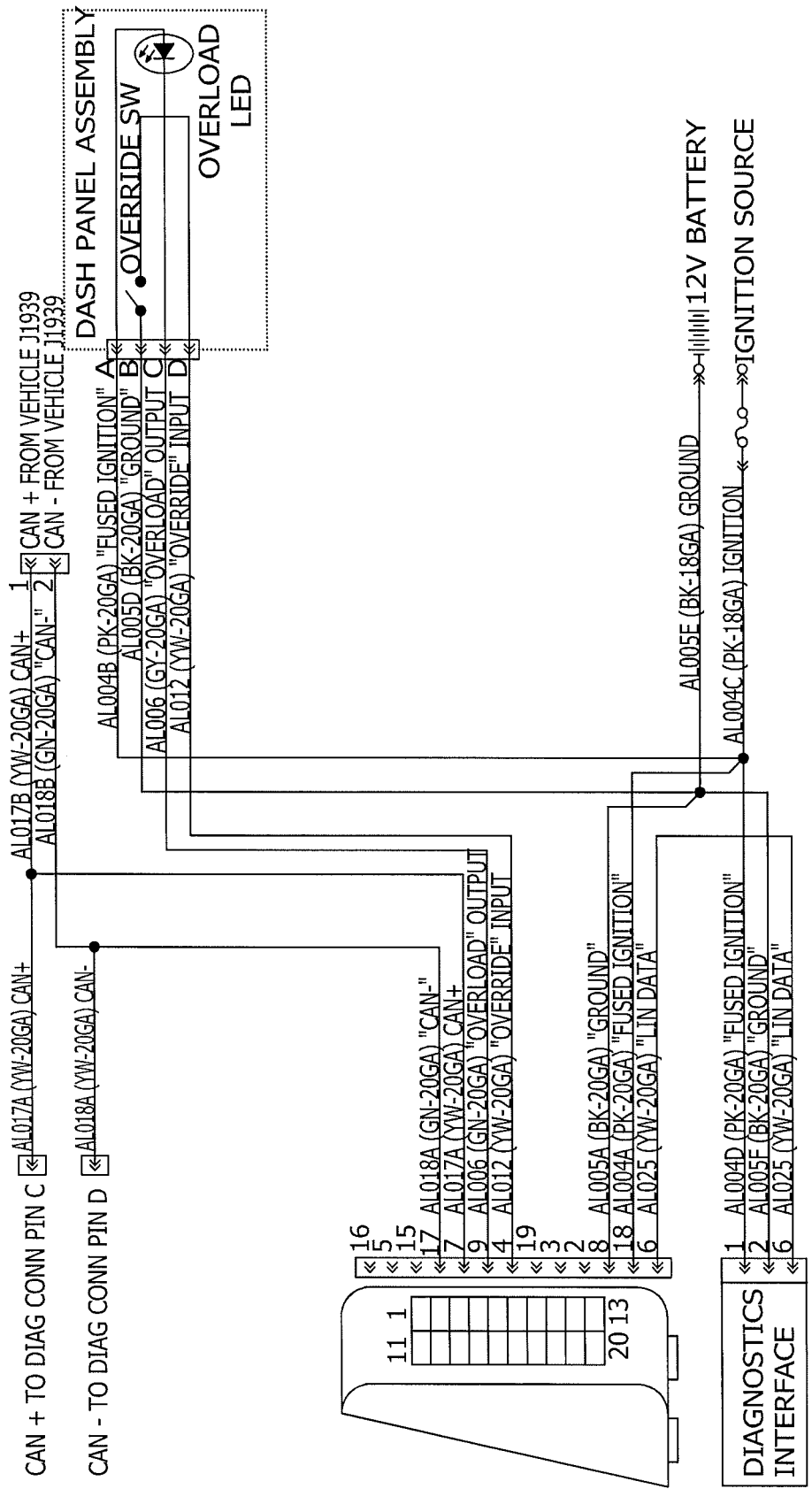
FIG. 3 is a schematic view of a portion of an electrical system of a traction control system according to the present disclosure.

FIGS. 2 and 3 schematically illustrate portions of exemplary pneumatic and electrical system, respectively, of a traction control system that may be used to carry out the traction control routines and concepts described herein. In one embodiment, the traction control system utilizes an integrated electronic control module (ECM) and 6-port valve body. The valve body manifold may be always pressurized by tank pressure (e.g., at 125 psi), with the pressure allowed to go to each control circuit being controlled by the amount of time a valve is held open. A preferred embodiment of the system monitors the air pressure in each of its control circuits and, if more pressure is desired, the valves are opened to allow more air in short bursts. Between each burst of full system pressure, the valve is closed and the pressure is measured again. The ECM continually monitors and either adds or vents air as needed to maintain the proper pressure. Since such a system utilizes solenoid valves and always operates at full system pressure, the varying hysteresis issue of a mechanical system is eliminated.

When the non-driven rear axle is lightly loaded compared to the driven axle, its tires may not provide as much lateral stability as those on the driven rear axle. In situations involving a trailer attached to the vehicle 10, when the non-driven rear axle is in the tag position, during an evasive maneuver such as a double lane change to avoid something in the road, the loads imparted by the trailer through the fifth wheel will act to steer the vehicle. The effect will be that the driver will feel like "the tail is wagging the dog" (i.e., that the trailer is trying to steer the truck) and will be required to put further steering inputs to stabilize the vehicle 10. As this is not a normal feeling, an inexperienced driver could over-react, causing further problems. When the non-driven rear axle is in the pusher position, the fifth wheel is between the steer (i.e., front) and driven axles and as such, this phenomenon does not occur. This is a reason why it may be preferred for the traction control concepts described herein to be incorporated into a vehicle having a non-driven rear axle in the pusher position, because it allows the traction control system to work safely to bias load between the rear axles even at highway speeds without compromising vehicle dynamics. However, as stated above, it is also within the scope of the present disclosure for the non-driven rear axle to be in the tag position.

To further increase safety, the control logic of the traction control system and automatic air suspension control system is preferably fully automated, requiring no driver or technician intervention. It will always maintain the maximum available load (or at least a relatively high load) on the driven rear axle up to its legal limit and will automatically lift and deploy the non-driven rear axle (if provided as a liftable pusher axle) as needed to ensure Federal Bridge Law compliance. Regardless of the trailer loading, the system will adapt appropriately and never let the driven rear axle be overloaded due to operator error.

In one embodiment, when the combined load assigned to the two rear axles 14 and 16 is less than a preselected amount or level, there is no load placed on the non-driven rear axle. This may be preferred for embodiments in which the non-driven rear axle is liftable. In an alternative embodiment, when the combined load assigned to the two rear axles 14 and 16 is less than a preselected amount or level, there is a non-zero load placed on the non-driven rear axle. This may be preferred for embodiments in which the non-driven rear axle is not liftable. The amount of load placed on the non-driven rear axle under such circumstances may be referred to as a baseline amount or level or load, which is preferably equal to or greater than the amount of load required to prevent the non-driven rear axle from "hopping." In one exemplary embodiment, a load of approximately 3000 pounds is a suitable baseline load for preventing the non-driven rear axle from "hopping," but the baseline load may vary without departing from the scope of the present disclosure. It should also be understood that it is within the scope of the present disclosure for the baseline load of a non-driven, non-liftable rear axle to be zero or for the baseline load of a non-driven liftable rear axle to be a non-zero amount. Preferably, the baseline load is maintained at a constant level, but it is also within the scope of the present disclosure for the magnitude of the baseline load to vary, provided that it remains below the magnitude of the load applied to the driven rear axle.

While the non-driven rear axle is maintained at the baseline load, the load on the driven rear axle is allowed to increase until it reaches a threshold amount or level or load. This portion of the traction control routine is represented by the $T_0$-$T_1$ time frame of FIGS. 4-6. In each of FIGS. 4-6, the baseline load applied to the non-driven rear axle is zero, such that the preselected combined load described above (i.e., the sum of the loads applied to the driven and non-driven rear axles) is equal to the threshold load applied to the driven rear axle. However, as described above, it is also within the scope of the present disclosure for the non-driven rear axle to be maintained at a non-zero baseline load, such that the preselected combined load is greater than the threshold load applied to the driven rear axle.

The threshold amount may be the maximum legal load that may be applied to the driven rear axle. For example, in one embodiment, it is legal for a load of up to 20,000 pounds to be applied to the driven rear axle, with a combined legal limit on the rear tandem axle of 34,000 pounds. In this case, the threshold amount may be 20,000 pounds, meaning that the non-driven rear axle will be maintained at a baseline load until the load applied to the driven rear axle by operation of the automatic air suspension control system 22 is approximately 20,000 pounds. In an alternative embodiment, the threshold amount or level or load is less than the maximum legal load that may be applied to the driven rear axle, such as a threshold amount of 17,000 pounds when the maximum legal load is 20,000 pounds. In such an embodiment, the non-driven rear axle will be maintained at a baseline load until the load applied to the driven rear axle by operation of the automatic air suspension control system 22 is approximately 17,000 pounds.

Figure 4:
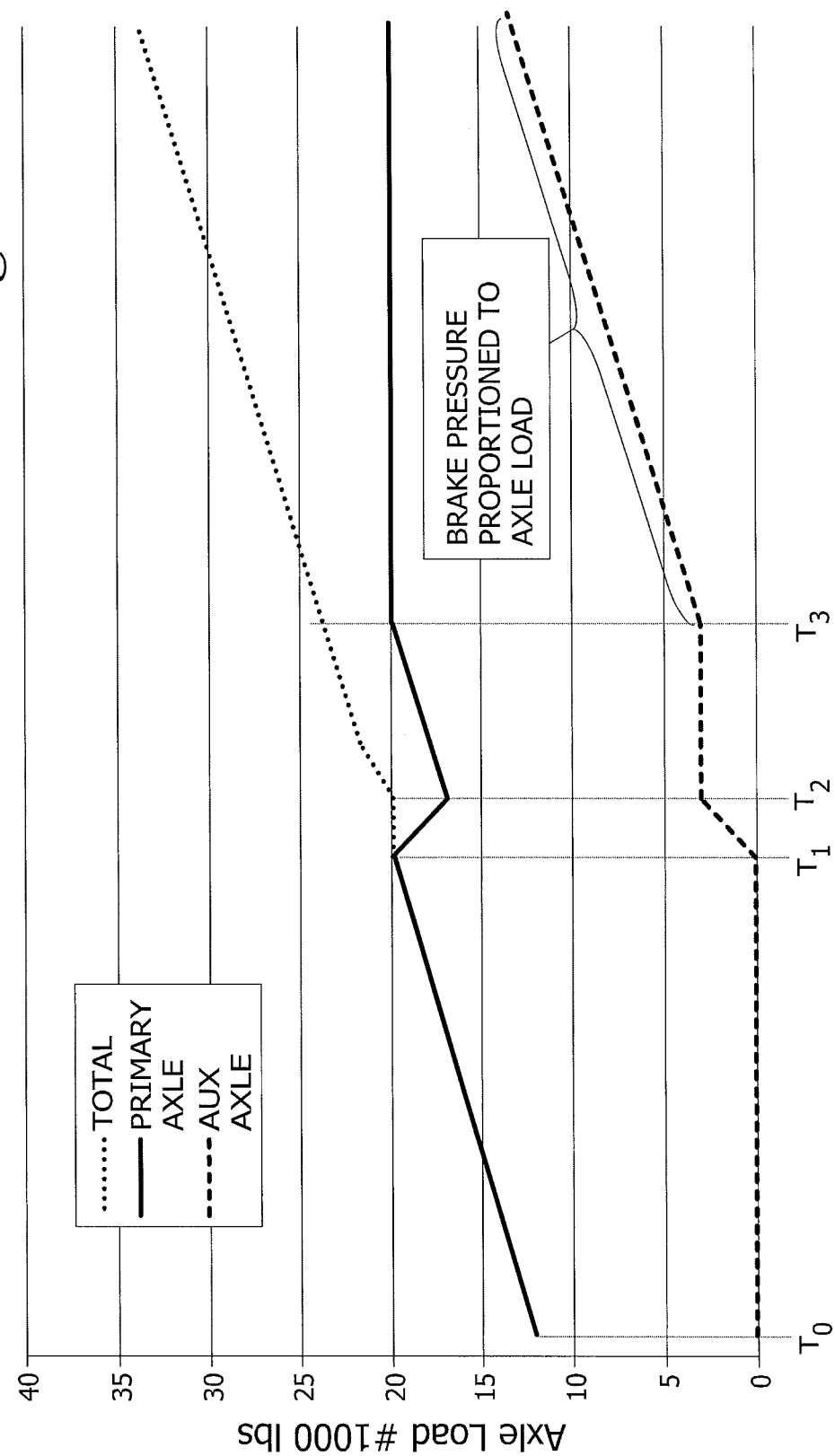
FIGS. 4-6 are graphs representing different exemplary implementations of a traction control routine according to the present disclosure.
Figure 5:
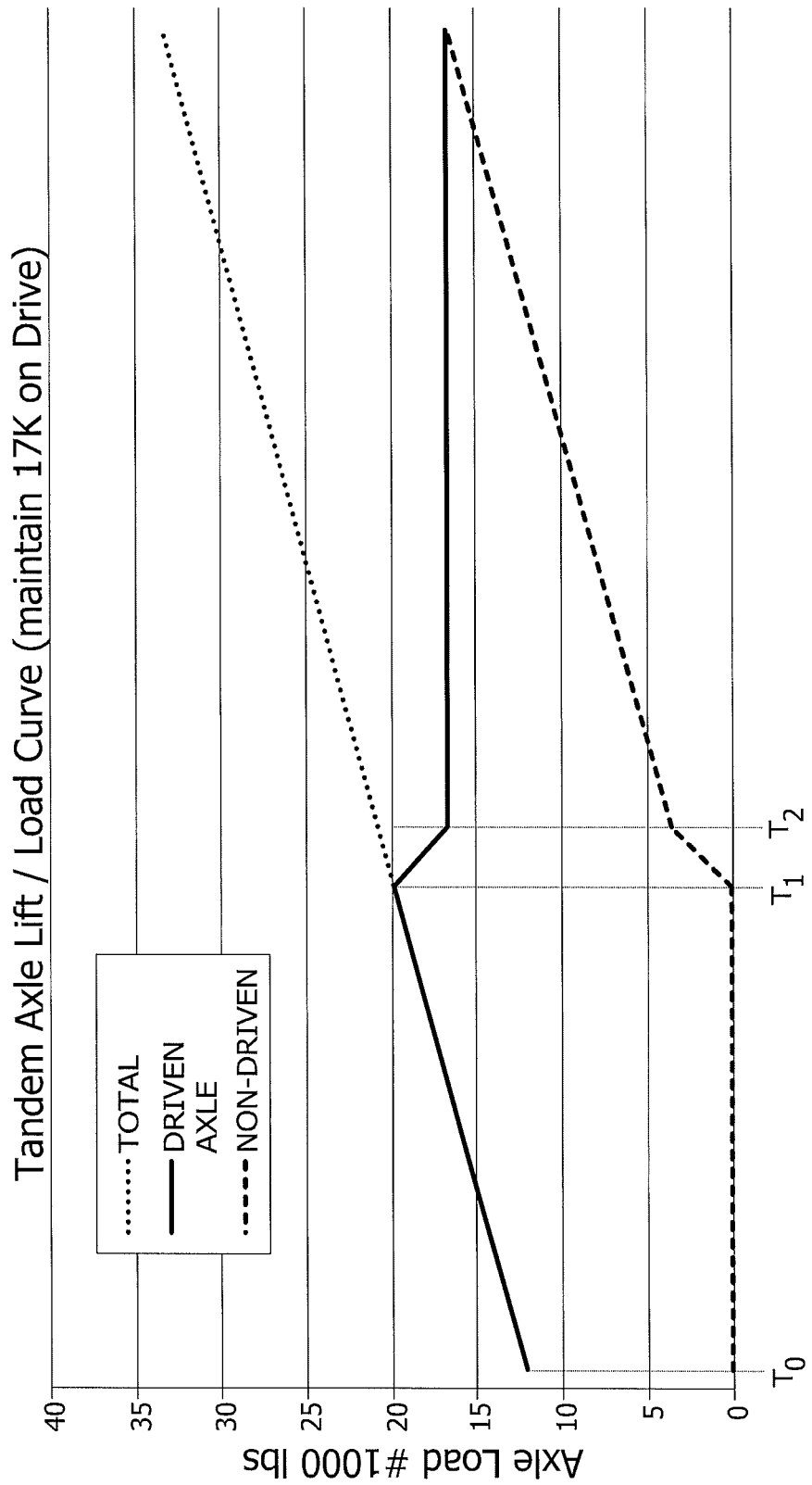
Figure 6:
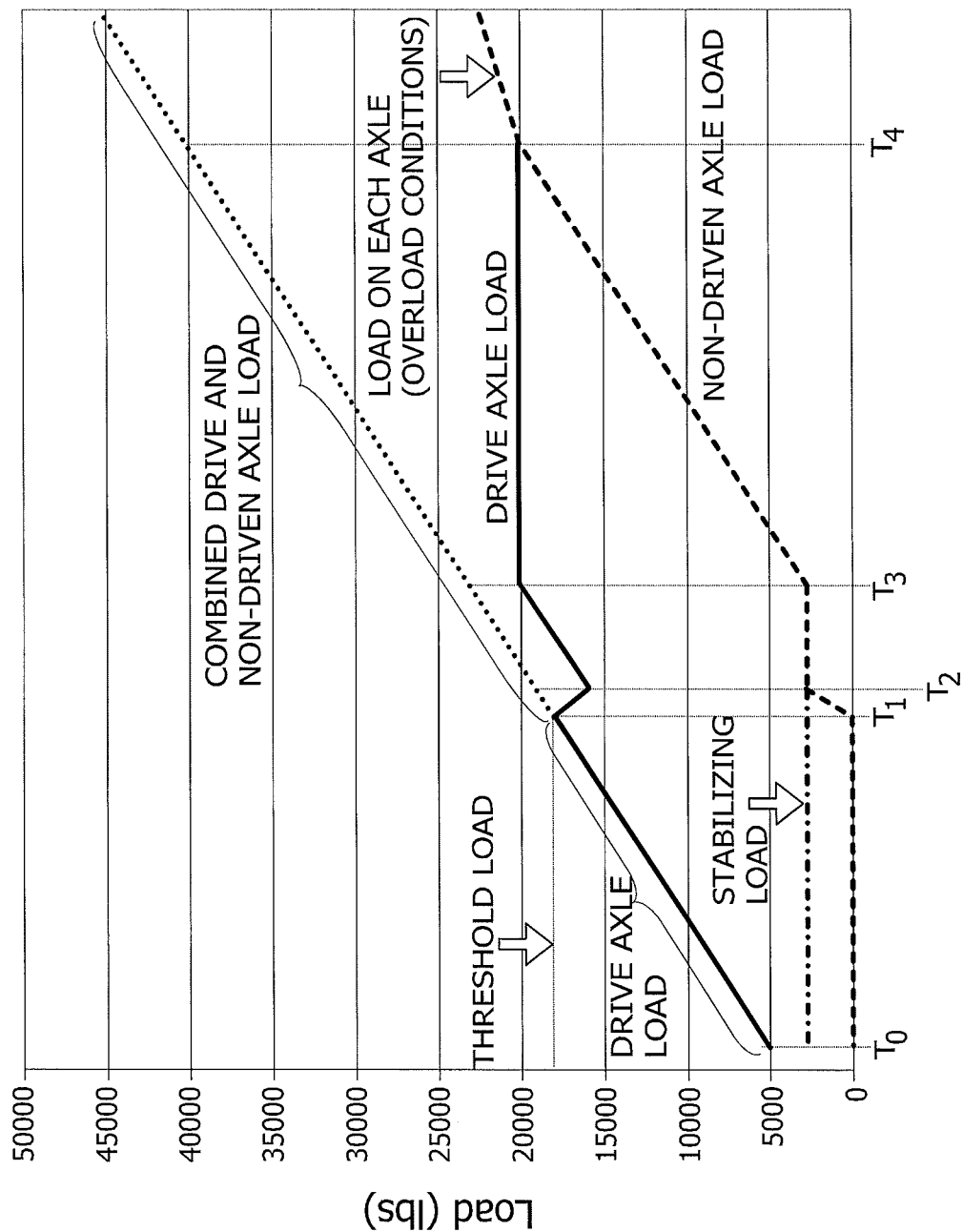

When the load on the driven rear axle reaches the threshold amount (represented in FIGS. 4-6 as occurring at time $T_1$), the air suspension control system 22 may respond according to one of a variety of possible routines. FIGS. 4-6 illustrate three exemplary routines, but it should be understood that other traction control routines may also be employed without departing from the scope of the present disclosure.

According to an exemplary first control routine, which is shown in FIG. 4, when the load on the driven rear axle reaches threshold amount (illustrated as 20,000 pounds), the load applied to the driven rear axle decreases by action of the automatic air suspension control system, while the load applied to the non-driven rear axle is allowed to increase. This is shown as occurring during the $T_1$-$T_2$ time frame. In the illustrated embodiment, the load on the non-driven rear axle is zero until $T_1$, with the non-driven rear axle being a liftable axle that is out of engagement with the ground until $T_1$, when the load applied to the driven rear axle reaches the threshold amount. At $T_1$, the automatic air suspension control system decreases the air pressure in the lift spring 24 to lower the non-driven rear axle into contact with the ground and allow it to carry a portion of the combined load assigned to the rear axle tandem. The load on the non-driven rear axle may be allowed increase by any amount, but in a preferred embodiment, the load on the non-driven rear axle is allowed to increase until it reaches an amount that is sufficient to avoid "hop." In the illustrated embodiment, this "stabilizing amount" is approximately equal to 3,000 pounds, but the amount of load required to stabilize the non-driven rear axle may vary without departing from the scope of the present disclosure.

While the load on the non-driven rear axle is allowed to increase, the load on the driven rear axle decreases. In the illustrated embodiment, the automatic air suspension control system functions so as to maintain the combined load applied to the tandem rear axles at a constant level during the $T_1$-$T_2$ time frame. This is achieved by matching the rates at which the loads applied to the rear axles change, such that an incremental increase in the load applied to the non-driven rear axle is balanced out by an equal incremental decrease in the load applied to the driven rear axle. In other embodiments, which will be described in greater detail herein, the rates at which the loads applied to the rear axles change is not equal during the $T_1$-$T_2$ time frame.

Figure 4A:
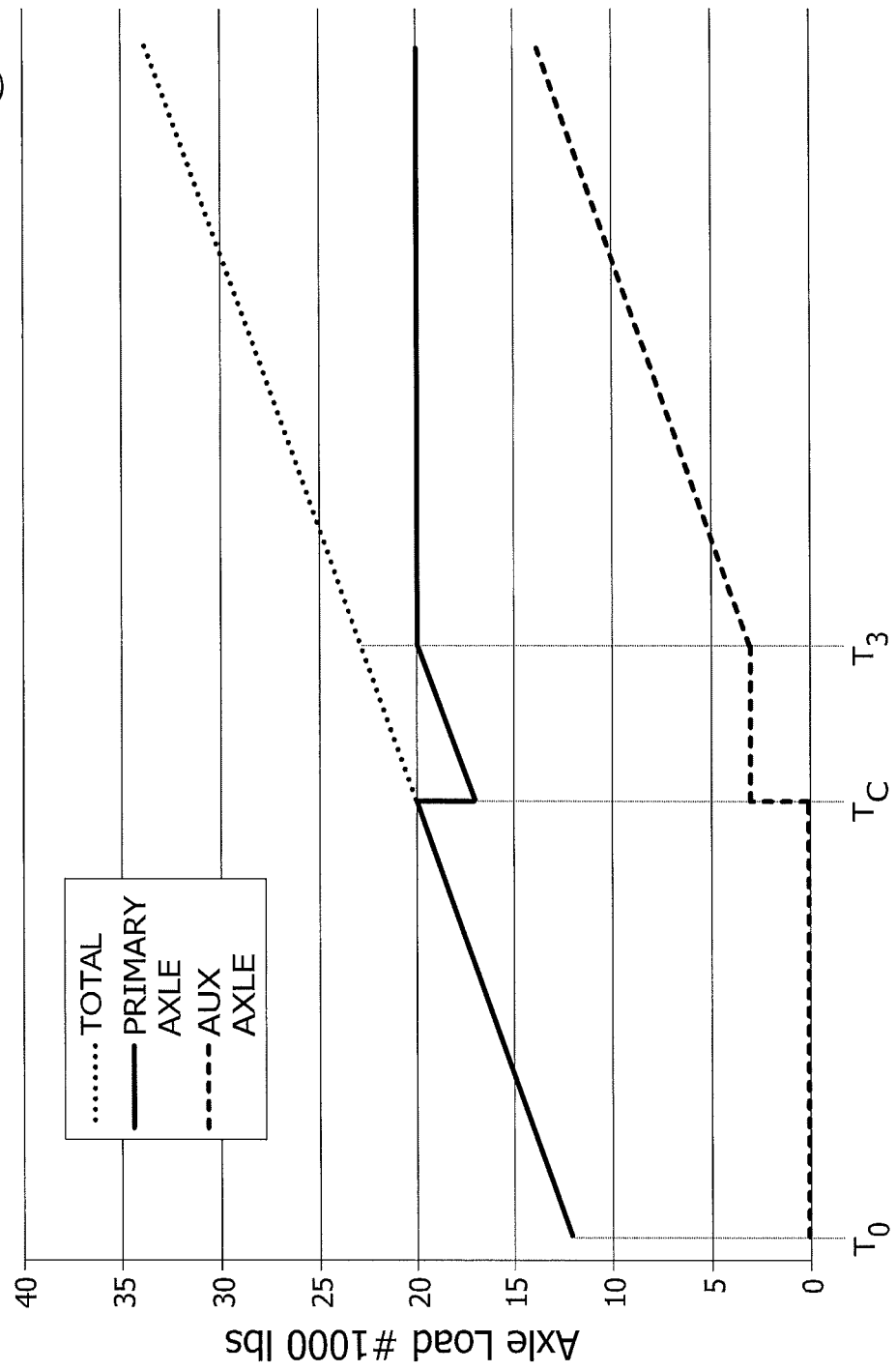

While FIG. 4 (as well as FIGS. 5 and 6) shows the $T_1$-$T_2$ time frame as occupying a definite amount of time, it should be understood that the control routine carried out during the $T_1$-$T_2$ time frame (and during any other time frame described herein) is not limited to any particular duration. For example, it should be understood that the control routine carried out during the $T_1$-$T_2$ time frame of FIG. 4 (i.e., decreasing the load on the driven rear axle while allowing the load on the non-driven rear axle to increase) may happen very quickly, such as substantially instantaneously or over a time frame on the order of one second or less. FIG. 4A is a modified version of FIG. 4, in which the control routine carried out during the $T_1$-$T_2$ time frame in FIG. 4 is substantially instantaneous at $T_C$, thereby presenting the loads in step-function form at that moment. However, it should be understood that, as in FIG. 4, the loads change at $T_C$ in a continuous fashion, rather than discontinuously jumping from one level to a higher or lower level, and that the step-function illustrated in FIG. 4 is merely intended to represent a rapid change in the loads applied to the driven and non-driven rear axles at $T_C$ and/or during the $T_1$-$T_2$ time frame.

When the load applied to the non-driven rear axle has reached the stabilizing amount or load (at $T_2$ in FIG. 4 or at $T_C$ in FIG. 4A), the load applied to the non-driven rear axle is maintained at the stabilizing load, as represented in FIG. 4 as taking place during the $T_2$-$T_3$ time frame (or $T_C$-$T_3$ in FIG. 4A). During this same time frame, the automatic air suspension control system 22 allows the load on the driven rear axle to increase. The load on the driven rear axle may increase at any rate and by any amount, but in the illustrated embodiment, the load on the driven rear axle is allowed to increase until it reaches the maximum legal limit.

When the load applied to the driven rear axle has reached a preselected level (illustrated in FIGS. 4 and 4A as the maximum legal limit), shown in FIGS. 4 and 4A at $T_3$, the automatic air suspension control system 22 maintains the load on the driven rear axle at that level while allowing the load on the non-driven rear axle to increase. As shown in FIGS. 4 and 4A, the load on the non-driven rear axle is never brought up to the same level as the load on the driven rear axle, because the maximum legal combined load on the tandem is reached first.

Figure 7:
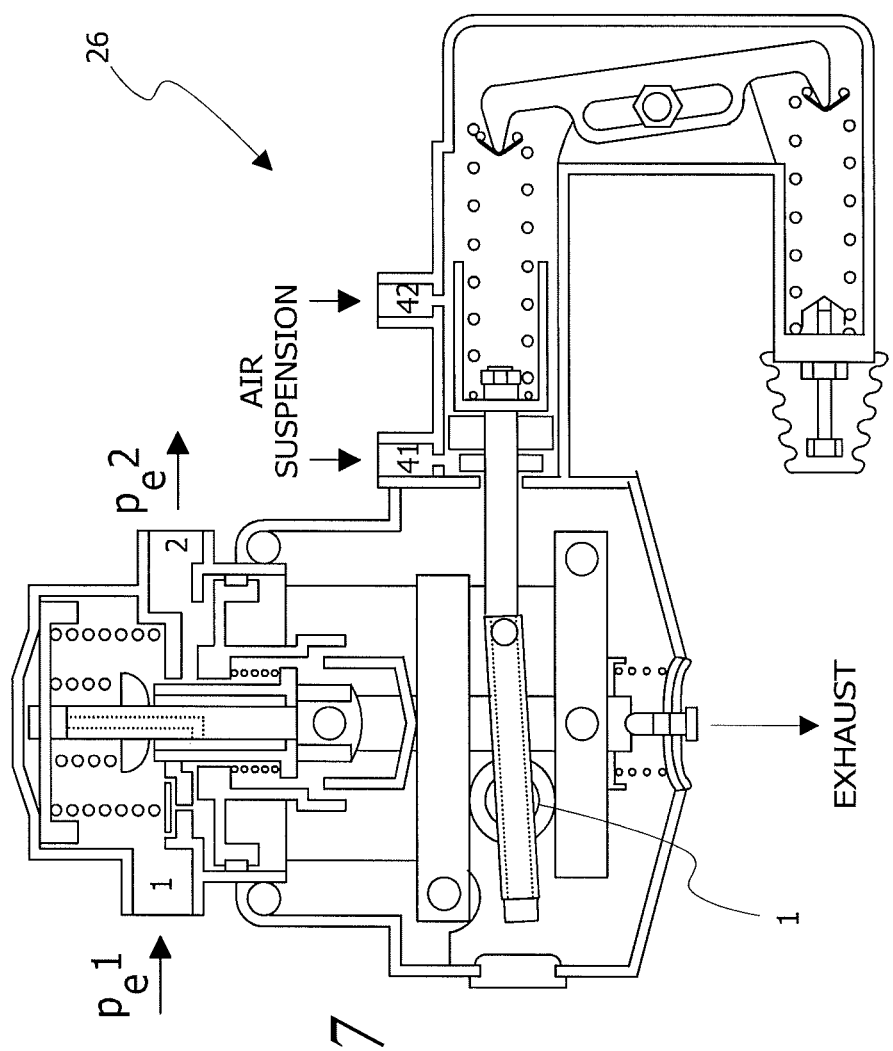
FIG. 7 is a cross-sectional view of an exemplary load proportioning valve of a brake control system of a traction control system according to the present disclosure.

On account of the loads applied to the rear axles being significantly different at all times, it may be preferred for the traction control system to include a brake control system that applies a brake control feature or brake pressure proportioning to the lightly loaded non-driven rear axle. Brake pressure proportioning may be implemented either through the control logic or with a commercially available load proportioning valve 26 of the type shown in FIG. 7 (e.g., a load sensing valve of the type manufactured by The Haldex Group of Stockholm, Sweden) to apply appropriate brake pressure to the lightly loaded non-driven rear axle to match its load so as to avoid locking it up during normal braking.

In a second exemplary control routine, which is shown in FIG. 5, the controls applied to the driven rear axle are the same as in FIG. 4 during the $T_0$-$T_2$ time frame. The controls applied to the non-driven rear axle are the same as in FIG. 4 during the $T_0$-$T_1$ time frame, but different during the $T_1$-$T_2$ time frame. As in the embodiment of FIG. 4, the automatic air suspension control system 22 allows the load on the non-driven rear axle to increase during the $T_1$-$T_2$ time frame, but the opposing load changes of the two rear axles is not equalized. Instead, the load applied to the non-driven rear axle is allowed to increase at a rate that is greater than the rate at which the load on the driven rear axle decreases. According, during the $T_1$-$T_2$ time frame (which may be substantially instantaneous), the combined load applied to the tandem will increase, rather than staying constant, as in the embodiment of FIG. 4. The load on the non-driven rear axle at $T_2$ may be any value (provided that it is less than the load on the driven rear axle and that the combined load of the two rear axles does not exceed the legal limit), but it may be preferred for the load to be at least equal to the stabilizing load required to prevent the non-driven rear axle from "hopping." Once the target load on the non-driven rear axle is reached at $T_2$, the automatic air suspension control system 22 functions to maintain the load on the driven rear axle at the level it had reached at $T_2$. In the illustrated embodiment, the load on the driven rear axle at $T_2$ is equal to half of the legal limit that may be applied to the tandem (e.g., 17,000 pounds when the legal limit on the tandem is 34,000 pounds). In such an embodiment, the load on the non-driven rear axle is allowed to increase after $T_2$ until it is equal to the load on the driven rear axle, which coincides with the maximum legal load on the tandem being reached. As in the embodiment of FIG. 4, brake proportioning of the non-driven rear axle may be employed.

In a third exemplary embodiment, which is shown in FIG. 6, the control routine may function so as to maintain the non-driven rear axle at a baseline load while the load on the driven rear axle is allowed to increase to a threshold amount at $T_1$ that is less than the legal limit. In the illustrated example, the legal limit is 20,000 pounds and the threshold amount to which the load on the driven rear axle is allowed to increase during the $T_0$-$T_1$ time frame is 19,000 pounds. In other embodiments, other threshold amounts that are less than the legal limit may also be employed without departing from the scope of the present disclosure.

When the load on the driven rear axle has reached the threshold amount at $T_1$, the automatic air control system 22 functions to decrease the load on the driven rear axle while allowing the load on the non-driven rear axle to increase over the $T_1$-$T_2$ time frame. Compared to the embodiment of FIG. 4, the load on the driven rear axle decreases to the same preselected amount and the load on the non-driven rear axle increases to the same preselected or stabilizing amount by $T_2$. However, in the embodiment of FIG. 4, the total combined load on the tandem stays constant during the $T_1$-$T_2$ time frame (because the load changes of the rear axles are equal, but opposite), whereas the total combined load on the tandem will increase during the $T_1$-$T_2$ time frame in the embodiment of FIG. 6 (rather than staying constant) on account of the load on the driven rear axle decreasing from a lower threshold amount at $T_1$. Stated differently, the embodiment of FIG. 6 differs from the embodiment of FIG. 4 during the $T_1$-$T_2$ time frame because the rate at which the load on the non-driven rear axle increases is greater than the rate at which the load on the driven rear axle decreases. As described above with respect to the control routines of FIGS. 4 and 5, it should be understood that the control routines carried out during the $T_1$-$T_2$ time frame of FIG. 6 may occur substantially instantaneously.

Furthermore, as shown in FIG. 6, the load on the non-driven rear axle is not brought up to the same level as the load on the driven rear axle until the maximum legal combined load (illustrated as 40,000 pounds) on the tandem is reached at $T_4$. When the loads on the rear axles have been equalized, any further load applied to the tandem (which will represent an overloaded condition) may be equally applied to the axles (represented to the right of $T_4$ in FIG. 6)

When the loads on the rear axles have reached their preselected amounts at $T_2$, the automatic air suspension control system 22 may carry out a routine during the $T_2$-$T_3$ time frame that is substantially the same as the routine carried out during that time frame in the embodiment of FIG. 4. In particular, the load on the non-driven rear axle may be maintained at the preselected or stabilizing amount while the load on the driven rear axle is allowed to increase until it reaches the maximum legal limit at $T_3$. As in the embodiment of FIG. 4, when the load on the driven rear axle has reached the maximum legal limit at $T_3$, the load on the non-driven rear axle may be allowed to increase until the combined load applied to the tandem reaches the legal limit. As in the other exemplary embodiments, brake proportioning of the non-driven rear axle may be employed.

It should be understood that the three control routines illustrated in FIGS. 4-6 are merely exemplary and that other traction control routines may be employed without departing from the scope of the present disclosure. For example, the control routine during one of the time frames of one illustrated control routine may be incorporated into the corresponding time frame of another illustrated control routine. Other variations may also be employed without departing from the scope of the present disclosure. In one such variation, which may be employed in combination with any traction control routine of the present disclosure, the traction control system includes one or more sensors configured to determine when wheel-slip occurs. When wheel-slip is detected, load may be temporarily shifted from the non-driven rear axle to the driven rear axle for improved traction. The amount of load that is transferred from the non-driven rear axle to the driven rear axle may vary, but may be anywhere from a percentage of the load on the non-driven rear axle to all of the load on the non-driven rear axle. In one embodiment, when all of the load on a liftable non-driven rear axle is transferred to the driven rear axle, the non-driven rear axle may be lifted off of the ground. When the traction control system determines that wheel-slip has ended, all or a portion of the load transferred from the non-driven rear axle to the driven rear axle may be shifted back to the non-driven rear axle. It is within the scope of the present disclosure for this wheel-slip response sub-routine to be performed at any speed, but it may be preferred to limit application of the sub-routine to wheel-slip that occurs under a pre-selected maximum speed.

If the vehicle 10 includes a dry freight van trailer or a refrigerated trailer, the trailer may have what is called a "slider," in which case the trailer axles are attached to a subframe that has the capability of being moved longitudinally relative to the remainder of the trailer. An exemplary slider is described in U.S. Pat. No. 7,207,593 to Saxon et al., which is incorporated herein by reference. In this case, the slider could be repositioned so that load is transferred from the two rear tractor axles 14 and 16 to the trailer axles. For example, if the rear tractor axles are carrying a combined 24,000 pound load and 4,000 pounds are transferred to the trailer axles, then the two truck axles would be carrying only 20,000 pounds (i.e., the legal limit that may be carried by the driven rear tractor axle in one example). According to the present disclosure, rather than equalizing the load on the rear tractor axles, all of the load on the rear tractor axles is transferred to the driven rear axle (loading it to the legal limit), thereby allowing the non-driven truck axle to be lifted off the ground if it is equipped with a lifting mechanism, which has a number of advantages. For example, fuel economy is improved due to the parasitic losses of the non-driven axle rear being eliminated. Recent testing by the inventors has shown that a 2% reduction in horsepower required at 65 MPH is achievable. Additionally, tire wear is improved because the slide forces experienced by the tires during turning are eliminated.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A vehicle traction control system for a vehicle, comprising:
   a non-driven liftable rear axle, the non-driven liftable rear axle comprising a pusher axle;
   a driven rear axle for propelling the vehicle, the vehicle comprising a tractor, and the non-driven liftable rear axle and the driven rear axle disposed on the tractor;
   an air suspension including a lift spring associated with the non-driven liftable rear axle and configured to lift and maintain the non-driven liftable rear axle out of contact with a ground surface when there is no load applied to the non-driven liftable rear axle and to lower and maintain the non-driven rear axle in contact with the ground surface when there is a non-zero load applied to the non-driven liftable rear axle, the air suspension also including a ride spring associated with each of the rear axles and configured to cause a load to be applied to the non-driven liftable rear axle and a load to be applied to the driven rear axle; and
   an automatic air suspension control system associated with the air suspension and programmed to control operation of the air suspension to adjust an air pressure of one or more of the ride springs to maintain the load applied to the non-driven liftable rear axle at a level that is less than the load applied to the driven rear axle until the load applied to the driven rear axle is equal to a threshold amount and, upon the load applied to the driven rear axle reaching the threshold amount, decreasing the load applied to the driven rear axle and increasing the load applied to the non-driven liftable rear axle, so as to reduce wheel-slip and to improve vehicle traction.

2. The vehicle traction control system of claim 1, wherein the level is zero.

3. The vehicle traction control system of claim 1, wherein the threshold amount is a preselected amount below the maximum legal load that may be applied to the driven rear axle.

4. The vehicle traction control system of claim 1, wherein the automatic air suspension control system is further programmed to increase the load applied to the non-driven liftable rear axle by a stabilizing amount and to decrease the load applied to the driven rear axle by a substantially equal amount when the load applied to the driven rear axle first reaches the threshold amount.

5. The vehicle traction control system of claim 4, wherein the automatic air suspension control system is further programmed such that after the load applied to the non-driven liftable rear axle has been increased to the stabilizing amount, the load applied to the non-driven liftable rear axle is maintained at the stabilizing amount while the load applied to the driven rear axle is allowed to increase.

6. The vehicle traction control system of claim 5, wherein the automatic air suspension control system is further programmed to maintain the load applied to the non-driven liftable rear axle at the stabilizing amount while the load applied to the driven rear axle is allowed to increase until the load applied to the driven rear axle is equal to the maximum legal load that may be applied to the driven rear axle.

7. The vehicle traction control system of claim 6, wherein the automatic air suspension control system is further programmed such that after the load applied to the driven rear axle has increased to the maximum legal load, the load applied to the non-driven liftable rear axle is allowed to increase.

8. The vehicle traction control system of claim 1, further comprising a brake associated with the non-driven liftable rear axle and a brake control system associated with said brake and programmed to vary the brake pressure applied by the brake based at least in part on the load applied to the non-driven liftable rear axle.

9. The vehicle traction control system of claim 1, wherein the automatic air suspension control system is programmed to detect wheel slip and, on a first condition that wheel-slip is detected and said first condition is satisfied, to transfer at least a portion of the load on the non-driven liftable rear axle to the driven rear axle.

10. The vehicle traction control system of claim 9, wherein the automatic air suspension control system is programmed to only transfer load from the non-driven liftable rear axle to the driven rear axle upon a second condition that wheel-slip is detected and a third condition that the speed of the vehicle is less than a pre-selected amount, and both of said second and third conditions are satisfied.

11. The vehicle traction control system of claim 9, wherein all of the load on the non-driven liftable rear axle is transferred to the driven rear axle upon wheel slip being detected, and the non-driven liftable rear axle is lifted out of contact with a ground surface.

12. The vehicle traction control system of claim 1 wherein the load applied to the non-driven liftable rear axle is permitted to increase while the load applied to the driven rear axle is maintained at a constant level as a combined load applied to the non-driven liftable rear axle and the driven rear axle is increased.

13. The vehicle traction control system of claim 1 wherein the load applied to the non-driven liftable rear axle is permitted to decrease while the load applied to the driven rear axle is maintained at a constant level as a combined load applied to the non-driven liftable rear axle and the driven rear axle is decreased.

14. The vehicle traction control system of claim 1 wherein said vehicle is attached to a trailer, and the load to be applied to the non-driven liftable rear axle and the load applied to the driven rear axle are based on a combined load of the tractor and the trailer.

15. The vehicle traction control system of claim 1 wherein the tractor is a 6×2 tractor.

16. A method of controlling the traction of a vehicle having a non-driven liftable rear axle and a driven rear axle, the non-driven liftable rear axle comprising a pusher axle, the vehicle comprising a tractor, and the non-driven liftable rear axle and the driven rear axle disposed on the tractor, and an air suspension including a ride spring associated with each of the rear axles to apply a load to each of the rear axles, the method comprising:
lifting and maintaining the non-driven liftable rear axle out of contact with a ground surface when there is no load applied to the non-driven liftable rear axle and lower and maintaining the non-driven liftable rear axle in contact with the ground surface when there is a non-zero load applied to the non-driven liftable rear axle,
controlling operation of the air suspension to adjust an air pressure of one or more of the ride springs to maintain the load applied to the non-driven rear axle at a level that is less than the load applied to the driven rear axle until the load applied to the driven rear axle is equal to a threshold amount, and
upon the load applied to the driven rear axle reaching the threshold amount, decreasing the load applied to the driven rear axle and increasing the load applied to the non-driven liftable rear axle, thereby reducing wheel-slip and improving vehicle traction.

17. The method of claim 16, wherein the level is zero.

18. The method of claim 16, wherein the threshold amount is a preselected amount below the maximum legal load that may be applied to the driven rear axle.

19. The method of claim 16, further comprising substantially simultaneously decreasing the load applied to the driven rear axle and increasing the load applied to the non-driven liftable rear axle when the load applied to the driven rear axle first reaches the threshold amount.

20. The method of claim 19, further comprising, increasing the load applied to the non-driven liftable rear axle by a stabilizing amount and decreasing the load applied to the driven rear axle by a substantially equal amount when the load applied to the driven rear axle first reaches the threshold amount, and after the load applied to the non-driven liftable rear axle has been increased to the stabilizing amount, maintaining the load applied to the non-driven liftable rear axle at the stabilizing amount while the load applied to the driven rear axle is allowed to increase.

21. The method of claim 20, further comprising maintaining the load applied to the non-driven liftable rear axle at the stabilizing amount while allowing the load applied to the driven rear axle to increase until the load applied to the driven rear axle is equal to the maximum legal load that may be applied to the driven rear axle.

22. The method of claim 21, further comprising, after the load applied to the driven rear axle has increased to the maximum legal load, allowing the load applied to the non-driven liftable rear axle to increase.

23. The method of claim 16, further comprising varying a brake pressure applied to the non-driven axle based at least in part on the load applied to the non-driven liftable rear axle.

24. The method of claim 16, further comprising detecting wheel-slip and, on a first condition that wheel-slip is detected and said first condition is satisfied, transferring at least a portion of the load on the non-driven liftable rear axle to the driven rear axle.

25. The method of claim 24, wherein said detecting wheel-slip includes determining the speed of the vehicle and only transferring load from the non-driven liftable rear axle to the driven rear axle upon wheel-slip being detected on a second condition that the speed of the vehicle is less than a pre-selected amount and said second condition is satisfied.

26. The method of claim 24, wherein said detecting wheel-slip includes lifting the non-driven liftable rear axle out of contact with a ground surface when all of the load on the non-driven rear axle is transferred to the driven rear axle upon wheel slip being detected.

27. The method of claim 16 wherein the load applied to the non-driven liftable rear axle is permitted to increase while the load applied to the driven rear axle is maintained at a constant level as a combined load applied to the non-driven liftable rear axle and the driven rear axle is increased.

28. The method claim 16 wherein the load applied to the non-driven liftable rear axle is permitted to decrease while the load applied to the driven rear axle is maintained at a constant level as a combined load applied to the non-driven liftable rear axle and the driven rear axle is decreased.

29. The method of claim 16 wherein said vehicle is attached to a trailer, and the load to be applied to the non-driven liftable rear axle and the load applied to the driven rear axle are based on a combined load of the tractor and the trailer.

30. The method of claim 16 wherein the tractor is a 6×2 tractor.

* * * * *